Feb. 2, 1932. R. T. HOSKING 1,843,675
BURR FORMING TOOL
Filed Aug. 13, 1930
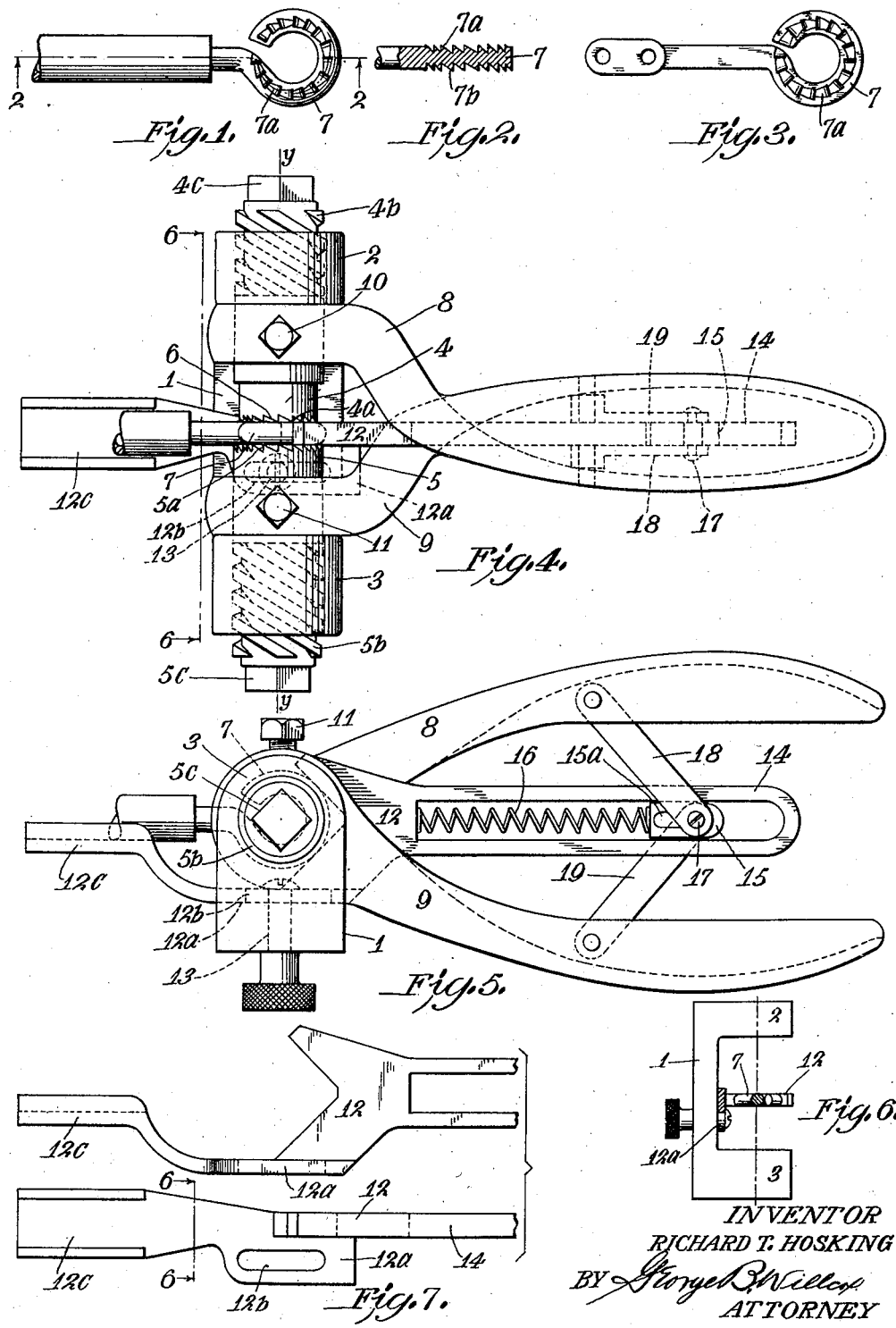
INVENTOR
RICHARD T. HOSKING
BY George B. Willcox
ATTORNEY Patented Feb. 2, 1932

1,843,675

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

BURR FORMING TOOL

Application filed August 13, 1930. Serial No. 474,961.

This invention is a tool for forming series of ratchet-like burrs or teeth in the opposite faces of a circular loop such as is commonly formed in the end of a wire connector. The tool may also be used for forming similar burrs in the opposite faces of an electric terminal washer made from flat metal.

Such burrs, when formed by this tool in the manner to be presently described, are useful for establishing better electrical contact between the loop terminal and its binding screw or nut, firstly, because in forming the burrs it turns up and exposes on them new surfaces of bright clean metal that give more perfect electrical contact between the connector and the nut or bolt by which it is clamped in service, secondly, because the burrs made by this tool are of ratchet-like configuration and are directioned on the opposite sides of the loop or connector so that a nut, after being tightened down upon them will, to a considerable degree, resist tendency to turn in the reverse direction. That is to say, either a round wire connector or a flat connector, after being burred by this tool possesses somewhat the property of a nut lock to resist unscrewing.

The claimed invention is found in the structure of the cutting dies, in the means for actuating them to plow into the work-piece in the desired manner, in the adjustable device for holding work-pieces of different sizes in properly centered position between the dies, in the device for preventing the shank of the work-piece from being displaced while the dies are cutting, and in an equalizing device that interconnects the two dies and constrains them to operate with opposite and equal embedding and tooth-plowing movements when engaged in the work.

By way of illustration I shall describe the invention as embodied in a hand-operated tool having the general appearance of pliers, although it will be apparent that the pair of opposed burr-cutting dies, constituting the essential feature, may be actuated by power-driven gears in known manner instead of by the manually operated plier handles herein shown, without departing from my invention as set forth in certain of the claims.

With the foregoing and other objects in view which will appear later in the specification, my invention comprises the devices described and claimed and the equivalents thereof.

In the drawings Fig. 1 is a plan view of a wire loop with projections as cut by the tool.

Fig. 2 is a part sectional edge view on line 2—2 of Fig. 1, showing the projections diagrammatically.

Fig. 3 is a plan view of a terminal formed from wire or stamped from flat stock and toothed by this tool.

Fig. 4 is a side view of the tool with the work piece in place.

Fig. 5 is a bottom view of the parts shown in Fig. 4.

Fig. 6 is a section on line 6—6 of Figs. 4 and 7, showing the yoke, with the dies and handles omitted.

Fig. 7 is a detail of the work-centering and holding device.

The hand tool selected for illustration consists primarily in a frame member or yoke 1 having two jaws 2, 3 spaced apart and bored to provide guideways within which are dies 4, 5 slidable and bored co-axially, their opposing end surfaces each having an annular ring or circle of ratchet teeth 4a, 5a cut therein. The inclined facets 6 of the individual teeth are oppositely directed on the two dies, for purposes that will presently appear.

Actuating means is provided for forcing these two dies to approach each other and to simultaneously embed their teeth into the opposite faces of the loop, terminal or similar work-piece 7 located between them.

The two dies, during their endwise approach, are given slight rotary movements, simultaneously in opposite directions, so that the resultant combined embedding and plowing operations raise up or swage two annular series of tooth-like burrs 7a, 7b out of the opposite faces of the work-piece.

Each die has an external feeding-in thread 4b, 5b that meshes with a corresponding internal thread in the bore of the corresponding jaw.

The pitch of the threads on the die and yoke is appropriate to produce that relationship between the turning movements of the dies and their approach movement which results in imparting to the burrs 7a, 7b the correct shape and size.

In the hand-operated type of tool each die is provided with an actuating handle 8, 9 secured to its punch by a set screw 10, 11. The handles are appropriately shaped to adapt them both to be held in one hand.

When the handles 8, 9 are squeezed together from the position shown in Fig. 5 the dies are turned through equal small angles in opposite directions and their ratchet teeth bite into the work.

For positively holding the wire loop or terminal central with the axial line y, y of the dies, a V-notched plate 12 flanged at 12a is fastened, by means of a screw 13, to the yoke 1. Flange 12a is slotted at 12b to receive the screw 13, permitting sufficient adjustment of the V-notch of plate 12 toward and away from the axial line y, y to appropriately center different sizes of loops or terminals.

For holding the loop or terminal against movement sidewise, that is to say, in alined relationship with the tool as a whole while the dies are performing their work, and thereby insuring that the resultant teeth shall be of the same size and shape on both sides of the work-piece, there is associated with plate 12 and its flange 12a a troughed guide 12c in which the shank is held, as shown in Figs. 4 and 5.

An equalizing device is also carried by plate 12 to insure symmetrical approaching and receding movements of the two handles 8, 9 and of the dies 4, 5. The equalizer consists of a longitudinally slotted arm 14 integral with plate 12 and having a sliding block 15 and a retracting spring 16. Block 15 is provided with an aperture 15a, in which is received the pivot pin 17 of a joint that unites a pair of links 18, 19. The links are pivoted at their outer ends to the handles 8, 9. This mechanism equalizes the turning motion of the two dies and equalizes their longitudinal approach movements as well.

When the set screws 10 and 11 are released the dies may be set by means of a wrench applied to the squared ends 4c, 5c with their cutting teeth at a distance apart suitable to accommodate the thickness of the work.

To adapt the tool for rapid production of toothed loops or to the making of heavy work, it is only necessary to substitute gears or other power-actuated die-rotating elements instead of the handles, which can be done without departing from my invention as herein claimed.

By the means above described I have produced a simple, relatively inexpensive tool which, in hand operated form, can be conveniently carried by electricians, linemen and others and can be quickly applied to a circular loop that has been formed in an electrical conductor, and by a single squeezing action of the handles, will form burrs or teeth on both faces of the loop, whereby the electrical conductivity of the finished joint is greatly improved, and the loop then can to some extent serve as a nut lock, tending to tightly maintain the electrical connection under all ordinary conditions of vibration.

Although I have shown and described the tool in its preferable form as being equipped with two opposing dies for forming burrs in both sides of the work-piece simultaneously, it is sometimes desirable to provide burrs in one side only. In such event I employ only one toothed die and in lieu of the opposite die may use a non-toothed die or a fixed anvil member as a work-supporting means for the under side of the work-piece, without forming any teeth in one side of it. Such construction of the tool is included in the scope of certain of the claims and is a part of my invention considered in its broader aspect.

Having thus described my invention, what I claim and desire to secure by Letters Patents is:

1. In a tool for forming burrs simultaneously on the opposite faces of a circular connector the combination of two dies axially alined, their opposing ends having projecting cutting teeth annularly arranged and of ratchet shape, a yoke having two jaws spaced apart and having bored guideways slidingly receiving the dies, said dies threaded in said guideways, means for rotating said dies about their axes simultaneously and equally in opposite directions, centering means engaging the work during rotation of the dies and during the embedment of their teeth in the faces of the work, and holding means adapted to prevent angular movement of the work during such operations.

2. In a tool for forming upstanding burrs on the opposite faces of a terminal connector loop, a yoke having two jaws spaced apart and having guideways, two dies axially alined and slidable in said guideways, the opposing ends of said dies having projecting cutting teeth, said dies threaded in said yoke, means for rotating said dies about their axes simultaneously and equally in opposite directions, a centering plate fixed to the yoke and engaging the loop of the work, and a guide member also fixed to the yoke for constraining the work against movement sidewise.

3. In a tool for forming upstanding burrs on the opposite faces of a terminal connector loop, a yoke having two jaws spaced apart and provided with guideways, two dies axially alined and slidable in said guideways, the opposing end faces of said dies having projecting cutting teeth, a handle secured to each die for rotating said dies about their axes simultaneously, an equalizing mechanism associated with said handles for constraining them to move equally in opposite directions, said dies and guideways being in threaded engagement adapted to cause the dies to move toward and away from each other during their rotation, and a plate holding the loop of the work in axially centered relationship to the dies.

4. In a tool for forming outwardly projecting burrs in a face of a looped connector, the combination of a yoke having a bored guideway, a die slidingly received in said guideway and having an annular series of projecting cutting teeth in its end face, said die threaded in said guideway, means for rotating the die about its axis and imparting to it angular movement and simultaneous longitudinal movement toward the work, work-supporting means, and centering means arranged to engage the work during the rotation of the die and during the embedment of its teeth in the face of the work.

In testimony whereof, I affix my signature.

RICHARD T. HOSKING.